United States Patent
Oyama

(10) Patent No.: US 10,828,776 B2
(45) Date of Patent: Nov. 10, 2020

(54) CONTROL DEVICE FOR LIMITING SPEED OF ROBOT

(71) Applicant: FANUC CORPORATION, Yamanashi (JP)

(72) Inventor: Takumi Oyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 134 days.

(21) Appl. No.: 16/178,601

(22) Filed: Nov. 2, 2018

(65) Prior Publication Data

US 2019/0160668 A1    May 30, 2019

(30) Foreign Application Priority Data

Nov. 28, 2017  (JP) ................. 2017-227972

(51) Int. Cl.
  *B25J 9/16*    (2006.01)
  *B25J 13/08*   (2006.01)
  (Continued)

(52) U.S. Cl.
  CPC ........... *B25J 9/1651* (2013.01); *B25J 9/1664* (2013.01); *B25J 9/1676* (2013.01); *B25J 13/084* (2013.01);
  (Continued)

(58) Field of Classification Search
  CPC . B25J 9/06; B25J 9/1664; B25J 9/1676; B25J 13/084; B25J 13/085; B25J 13/088; B25J 19/06; B25J 19/063; B25J 19/0075; G05B 2219/4061; G05B 2219/35148; G05B 2219/39001; G05B 2219/39082; G05B 2219/39097; G05B 2219/39098; G05B 2219/40201; G05B 2219/40202; G05B 2219/40317; G05B 2219/40492; G05B 2219/40559; G05B 2219/40582;
  (Continued)

(56) References Cited

U.S. PATENT DOCUMENTS

2009/0171505 A1   7/2009  Okazaki
2009/0312868 A1  12/2009  Tojo et al.
(Continued)

FOREIGN PATENT DOCUMENTS

DE   102008063081 A1   8/2010
DE   102013212887 A1   4/2014
(Continued)

*Primary Examiner* — Dale Moyer
(74) *Attorney, Agent, or Firm* — Hauptman Ham, LLP

(57) ABSTRACT

A control device includes a stop command unit for stopping an operation of a robot when a person comes in contact with the robot, and a speed limit unit for limiting the operation speed of the robot. A distance determination value relating to an accident caused by sandwiching a person is predetermined. The speed limit unit includes a model generation unit for generating three-dimensional models of two objects among the component of the robot, a hand, and object arranged around the robot, and a distance calculation unit for calculating the shortest distance between the models of the two objects. When the shortest distance is less than the distance determination value, the speed limit unit controls the operation speed of the robot so that the operation speed is equal to or lower than a predetermined limit speed.

6 Claims, 7 Drawing Sheets

(51) Int. Cl.
  *B25J 19/06*  (2006.01)
  *B25J 9/06*  (2006.01)

(52) U.S. Cl.
  CPC ............... *B25J 19/063* (2013.01); *B25J 9/06* (2013.01); *B25J 13/085* (2013.01); *B25J 13/088* (2013.01); *G05B 2219/39001* (2013.01); *G05B 2219/40201* (2013.01)

(58) Field of Classification Search
  CPC .......... G05B 2219/42288; G05B 2219/43203; G05B 2219/49141
  See application file for complete search history.

(56) References Cited

U.S. PATENT DOCUMENTS

| | | | |
|---|---|---|---|
| 2010/0318224 A1 | 12/2010 | Okuda et al. | |
| 2011/0273723 A1* | 11/2011 | Haberer | G01S 17/42 356/614 |
| 2011/0298579 A1* | 12/2011 | Hardegger | G01S 17/10 340/3.1 |
| 2014/0067121 A1* | 3/2014 | Brooks | B25J 9/1676 700/255 |
| 2017/0144302 A1 | 5/2017 | Rohmer et al. | |
| 2017/0320212 A1 | 11/2017 | Frisk et al. | |
| 2019/0007659 A1* | 1/2019 | Neubauer | G06K 9/00771 |

FOREIGN PATENT DOCUMENTS

| | | |
|---|---|---|
| DE | 102016203701 A1 | 9/2017 |
| JP | H5-345286 A | 12/1993 |
| JP | H6-226666 A | 8/1994 |
| JP | H9-254079 A | 9/1997 |
| JP | 2000039911 A | 2/2000 |
| JP | 3357392 B2 | 12/2002 |
| JP | 3902310 B2 | 4/2007 |
| JP | 2009233757 A | 10/2009 |
| JP | 2010-52116 A | 3/2010 |
| JP | 2015217451 A | 12/2015 |
| JP | 5902664 B2 | 4/2016 |
| JP | 2016209953 A | 12/2016 |
| JP | 6140114 B2 | 5/2017 |
| JP | 2017-94430 A | 6/2017 |
| JP | 2017177321 A | 10/2017 |

* cited by examiner

CONTROL DEVICE FOR LIMITING SPEED OF ROBOT

RELATED APPLICATIONS

The present application claims priority of Japanese Patent Application No. 2017-227972, filed on Nov. 28, 2017, the disclosure of which is hereby incorporated by reference herein in its entirety.

BACKGROUND OF THE INVENTION

1. Field of the Invention

The present invention relates to a control device for limiting a speed of a robot.

2. Description of the Related Art

In conventional art, a robot device in which an operator works in cooperation with a robot has been known. For example, it is known that the operator conveys a heavy object together with the robot device. The operator sometimes comes in contact with the robot since the operator performs an operation within a range where the robot operates. Thus, the control device of the robot can have a function for protecting the operator when the operator works with the robot.

The robot can be provided with a detector for detecting an external force applied by the operator. The control device of the robot can determine that the robot comes in contact with the operator when the external force is detected. Then, the control device can perform a control for stopping the robot (for example, Japanese Patent No. 6140114 and Japanese Patent No. 5902664).

Further, when the robot operates, the robot may interfere with other objects. In conventional art, a control is known that prevents one robot from interfering with other robots or interfering with other devices (for example, Japanese Unexamined Patent Publication No. 2010-52116A and Japanese Unexamined Patent Publication No. 2017-94430A). Furthermore, a control for preventing interference between an arm of the robot and an operation tool is known (for example, Japanese Patent No. 3902310 and Japanese Patent No. 3357392).

SUMMARY OF INVENTION

In a robot that operates in cooperation with an operator, the robot has a function for stopping the robot when the robot comes in contact with the operator. Further, as a safety function of a robot, a function for stopping the robot when it is determined that a member included in a robot device comes in contact with an object secured to the floor on which the robot device is installed has been known. By adopting this safety function, it is possible to prevent breakage of the members constituting the robot, the operation tool, or the object fixed on the floor. The robot control device can stop the robot when the distance between objects is less than 0 or a value obtained by adding a margin to 0.

In this regard, when the operator and the robot work in the same working area, the position and orientation of the robot change. The operator may be sandwiched between, for example, the arm of the robot and a workbench disposed around the robot. The control device stops the robot when an external force is detected. However, the robot operates due to inertia until the robot completely stops after a command for stopping the robot is issued. For example, when a stop command is issued while the direction of the arm is changing, the arm does not immediately stop. The arm stops after moving a predetermined distance due to the inertia.

When the operator is sandwiched by the component of the robot device, the operator continues to be pressed during the period in which the robot coasts after a robot stopping command is issued. Further, since the robot is continued to operate by inertia, the space by which the operator is caught is made small. As a result, there is the problem that the operator is sandwiched more strongly while the robot is continued to operate by the inertia.

One embodiment of the present disclosure is a control device for controlling an operation speed of a robot. The control device includes a stop command unit for stopping the operation of the robot when a person comes in contact with the robot. The control device includes a speed limit unit for limiting the operation speed of the robot, and a storage unit for storing information relating to control of the robot. A distance determination value relating to an accident caused by sandwiching a person between two objects among a component of the robot, an operation tool attached to the robot, and an object arranged around the robot, is predetermined and stored in the storage unit. The speed limit unit includes a model generation unit for generating three-dimensional models of at least two of the component of the robot, the operation tools, and the object arranged around the robot. The speed limit unit includes a distance calculation unit for calculating the shortest distance between the models of the two objects in the three-dimensional model, and a determination unit for determining whether or not the shortest distance is less than the distance determination value. When the shortest distance is less than the distance determination value, the speed limit unit controls the operation speed of the robot so that the operation speed is equal to or lower than a predetermined limit speed.

DETAILED DESCRIPTION

With reference to FIGS. 1 to 9, a control device of a robot in an embodiment will be described. The robot device of the present embodiment includes the robot that is capable of performing an operation in cooperation with an operator. The robot that is capable of operating in cooperation with the operator is referred to as a cooperative robot.

Figure 1:
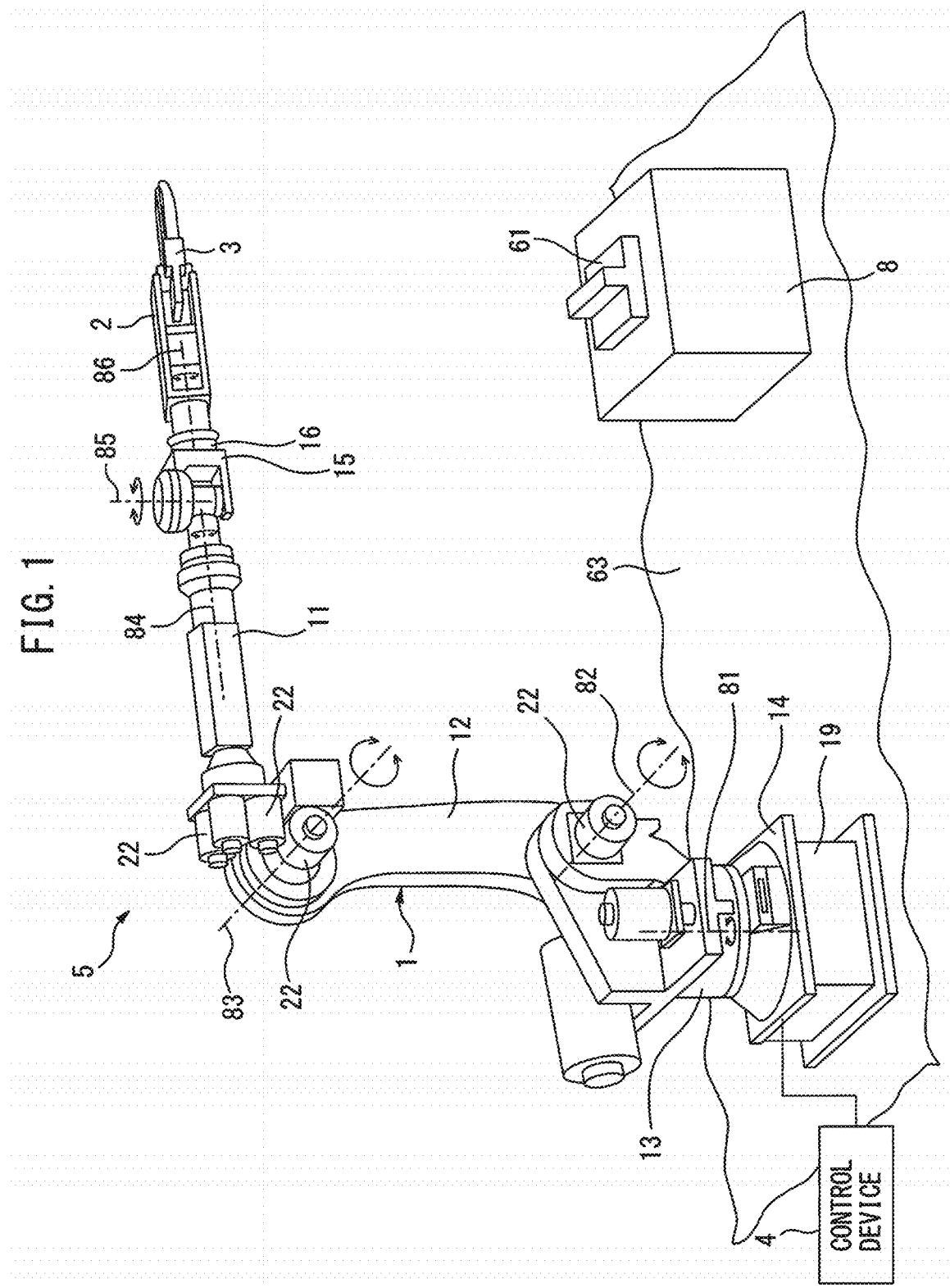
FIG. 1 is a perspective view of a robot device in an embodiment.

FIG. 1 is a perspective view of the robot device of the present embodiment. The robot device 5 includes a robot 1 and a hand 2 attached to the robot 1. The robot device 5 includes a control device 4 for controlling the robot 1 and the hand 2. A workbench 8 on which a workpiece 61 is placed is disposed within the range of motion of the robot 1. The robot 1 of the present embodiment is an articulated robot including a plurality of joint portions. In the articulated robot, the direction of an arm, a wrist and the like in each joint portion changes.

The hand 2 is an operation tool for gripping and releasing the workpiece 61. The operation tool is also referred to as an end effector. The hand 2 is secured to the wrist 15 of the robot 1. The hand 2 of the present embodiment is formed so that a pawl 3 is opened and closed. The operation tool is not limited to the hand 2, and any device according to the operation performed by the robot device 5 can be adopted. For example, an operation tool for welding or an operation tool for painting, etc. can be adopted.

The robot 1 of the present embodiment has a plurality of drive axes for driving the components of the robot 1. The drive axes of the robot 1 include rotation axes 81 to 86, i.e., a rotation axis 81 as a first axis (J1 axis) to a rotation axis 86 as a sixth axis (J6 axis). In the robot 1, the position and orientation change based on a plurality of drive axes, i.e., the J1 axis to the J6 axis.

The robot 1 includes a base 14 serving as a base and a swivel base 13 supported by the base 14. The swivel base 13 is formed so as to be rotatable with respect to the base 14. The robot 1 of the present embodiment includes a plurality of arms. The robot 1 includes an upper arm 11 and a lower arm 12. The lower arm 12 is supported by the swivel base 13. The lower arm 12 is formed so as to be rotatable with respect to the swivel base 13. The upper arm 11 is supported by the lower arm 12. The upper arm 11 is formed so as to be rotatable with respect to the lower arm 12.

The robot 1 includes a wrist 15 coupled to an end of the upper arm 11. The wrist 15 includes a flange 16 for fixing the hand 2. The wrist 15 is formed so as to rotate the flange 16 around the rotation axis 85. Further, the flange 16 is formed so as to rotate around the rotation axis 86.

Figure 2:
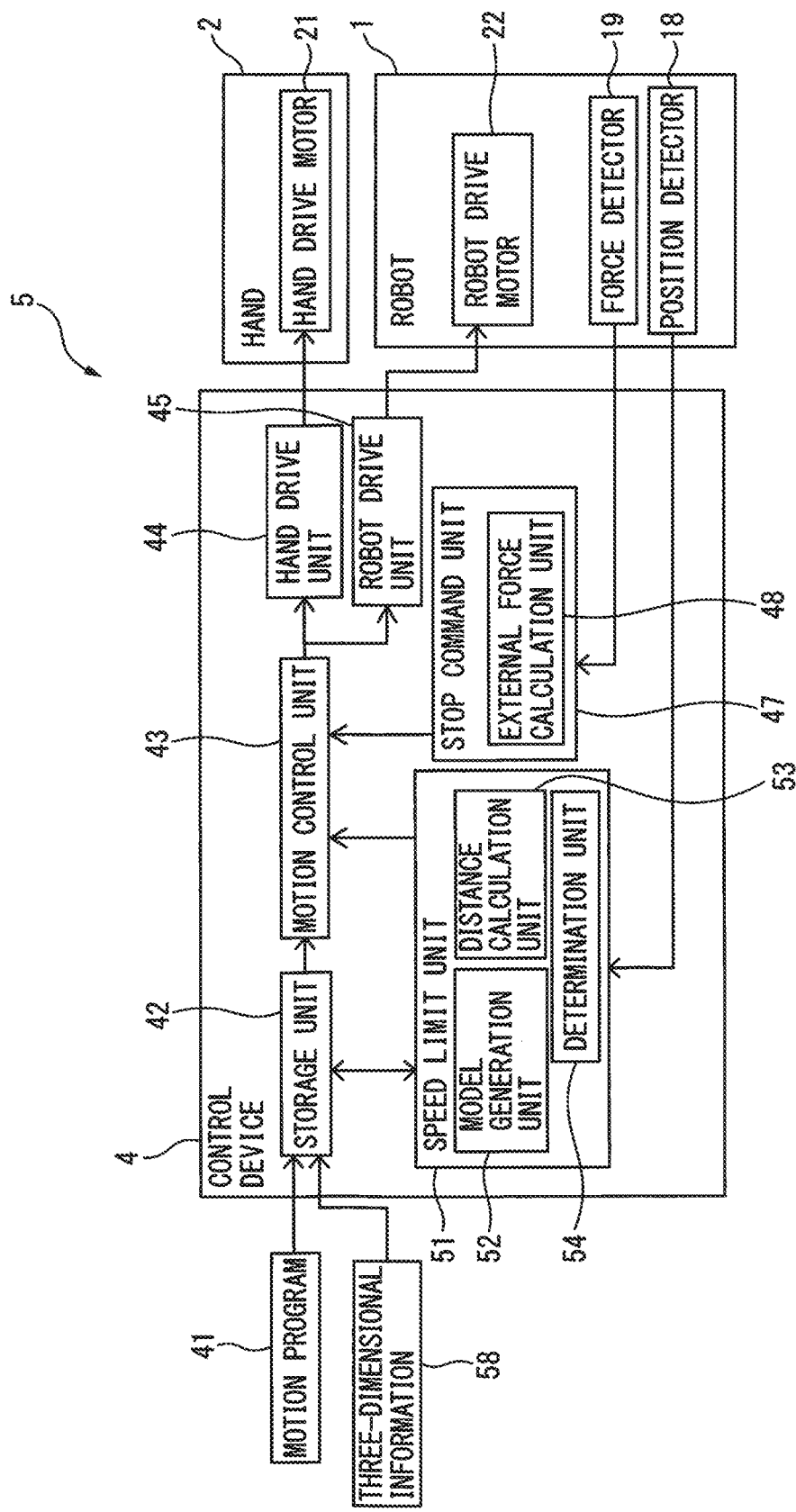
FIG. 2 is a block diagram of the robot device in the embodiment.

FIG. 2 is a block diagram of the robot device in the present embodiment. With reference to FIGS. 1 and 2, the robot 1 includes a robot drive device for changing the position and orientation of the robot 1. The robot drive device drives the components of the robot 1. The components driven by the robot drive device include the upper arm 11, the lower arm 12, the swivel base 13, the wrist 15, and the flange 16 of the wrist 15. The robot drive device includes a robot drive motor 22 for driving the components of the robot 1. In the present embodiment, one robot drive motor 22 is disposed so as to correspond one drive axis. The hand 2 includes a hand drive device for driving the hand 2. The hand drive device includes a hand drive motor 21 for driving the pawl 3 of the hand 2.

The robot device 5 of the present embodiment conveys a workpiece 61 based on a motion program 41. The robot 1 can automatically convey the workpiece 61 from an initial position to a target position based on the motion program 41.

The robot control device 4 includes an arithmetic processing device (computer) having a CPU (Central Processing Unit), and a RAM (Random Access Memory) and a ROM (Read Only Memory), etc., which are connected to the CPU via a bus. The control device 4 includes a storage unit 42 for storing information relating to the control of the robot 1. The motion program 41 previously created in order to operate the robot 1 is input to the control device 4. The motion program 41 is stored in the storage unit 42.

A motion control unit 43 transmits a motion command for driving the robot 1 to a robot drive unit 45 based on the motion program 41. The robot drive unit 45 includes an electric circuit for driving the robot drive motor 22. The robot drive unit 45 supplies electricity to the robot drive motor 22 based on the motion command. The robot drive motor 22 is driven so as to change the position and orientation of the robot 1.

Further, the motion control unit 43 transmits a motion command for driving the hand 2 to a hand drive unit 44 based on the motion program 41. The hand drive unit 44 includes an electric circuit for driving the hand drive motor 21. The hand drive unit 44 supplies electricity to the hand drive motor 21 based on the motion command. The hand drive motor 21 is driven so as to drive the pawl 3 of the hand 2. The hand 2 can grasp or release the workpiece 61.

The robot 1 includes a state detector for detecting the position and orientation of the robot 1. The state detector of the present embodiment includes a position detector 18 attached to the robot drive motor 22 corresponding to each drive axis. The output of the position detector 18 enables calculation of the position and orientation of each component in the corresponding drive axis. For example, the position detector 18 detects a rotation angle when the robot drive motor 22 is driven. Further, the position detector 18 can calculate the rotation speed of the robot drive motor 22 based on the rotation angle of the robot drive motor 22.

The robot 1 of the present embodiment cooperates with the operator so as to perform an operation. The control device 4 is formed so as to stop the robot 1 when a person such as the operator comes in contact with the robot 1. The robot 1 of the present embodiment includes a force detector 19 for detecting a force acting on the base 14. The force detector 19 is secured to a floor 63. The base 14 is supported by the force detector 19. The force acting on the base 14 corresponds to the force acting on the robot 1. The force detector 19 outputs a signal corresponding to the force applied from the operator to the robot 1.

As the force detector 19, any detector that is capable of detecting the magnitude of the force acting on the robot 1 and the direction of the force can be adopted. The force detector 19 of the present embodiment includes a metal base material coupled to the base 14 and a strain sensor attached to the surface of the base material. Then, the force detector 19 can calculate the force acting on the robot 1 based on the deformation amount detected by the strain sensor.

The control device 4 includes a stop command unit 47 for stopping the motion of the robot 1 when a person comes in contact with the robot 1. The stop command unit 47 stops the robot 1 when an external force is applied to the robot 1. The stop command unit 47 transmits a command for stopping the robot 1 to the motion control unit 43. The stop command unit 47 includes an external force calculation unit 48 for estimating an external force applied from the outside of the robot 1 to the robot 1. The force detected by the force detector 19 includes an internal force generated by the mass of the robot 1 and the motion of the robot 1 and an external force applied from the outside of the robot 1 to the robot 1.

The external force calculation unit 48 calculates an internal force acting on the robot 1 by the weight of the robot 1 when the robot 1 operates in a state where no force is applied from the outside of the robot 1. The internal force can be calculated based on the position and orientation of the robot 1 detected by the output of the position detector 18, the mass of the components of the robot 1 such as an arm and the mass of the hand 2. The mass of the components of the robot 1 and the mass of the hand 2 can be previously stored in the storage unit 42. The external force calculation unit 48 calculates an external force by subtracting the internal force from the force detected by the force detector 19. The external force corresponds to the force applied to the robot 1 by the operator or the like.

When the external force is larger than a predetermined determination value of the external force, the stop command unit 47 can determine that the person or object has come in contact with the robot 1. When the external force is larger than the predetermined determination value, the stop command unit 47 transmits a command for stopping the robot 1 to the motion control unit 43. The motion control unit 43 stops the motion of the robot 1. In other words, the motion control unit 43 stops all the robot drive motors 22 and the hand drive motor 21 which are driven. In this manner, the robot 1 of the present embodiment automatically stops when a person or an object comes in contact with the robot 1 during the period in which the robot 1 is operating.

The control device 4 of the present embodiment stops the robot 1 by calculating an external force acting on the robot 1, but the embodiment is not limited to this. The control device can detect contact of a person or an object at any configuration and under any control. For example, a contact sensor may be disposed on the outer peripheral surface of the robot so as to detect the contact of a person or an object. When the contact sensor detects the contact of a person or an object, the control device can stop the robot.

In the robot device 5 of the present embodiment, the operator performs an operation in the vicinity of the robot 1 during the period in which the robot 1 is driven. When the robot 1 is driven, a hand, a foot, etc. of the operator may be sandwiched by the component of the robot device 5 and an object arranged around the robot 1.

The components of the robot device 5 by which a person may be sandwiched include any members constituting the robot device 5. For example, the force detector 19, the base 14, the swivel base 13, the lower arm 12, the upper arm 11, the wrist 15, and the hand 2 are included. As the objects disposed around the robot 1, any members by which a person may be sandwiched can be adopted. For example, a machine tool, a processing machine such as a lathe, etc., a workbench 8, a conveyor for conveying a workpiece, and a cage in which workpieces are placed, that are arranged near the robot, or a fence formed around the robot device 5, etc. are shown. Further, in the present embodiment, the objects disposed around the robot 1 include the floor 63 on which the robot device 5 is installed.

The control device 4 of the present embodiment controls the operation speed of the robot 1 so that the operation speed is equal to or lower than a predetermined limit speed when the robot 1 is placed at a position and orientation, at which a person is likely to be sandwiched. The control device 4 of the present embodiment determines the distance between two objects based on a model of a component or the like constituting the robot device 5.

The operator previously inputs three-dimensional information 58 of the components of the robot device 5 and the objects arranged around the robot 1 into the control device 4. The three-dimensional information 58 is stored in the storage unit 42. As the three-dimensional information 58, for example, three-dimensional data generated by a CAD (Computer Aided Design) device can be used. The three-dimensional data of the robot 1 include shape data of the components of the robot 1 and the like. Not that the three-dimensional information 58 is not limited to three-dimensional data, and any data that is capable of generating a three-dimensional model can be adopted. For example, two-dimensional data formed by a CAD device may be input as three-dimensional information to the control device 4, and a three-dimensional model may be created inside the control device 4.

The control device 4 includes a speed limit unit 51 for limiting the operation speed of the robot 1. The speed limit unit 51 includes a model generation unit 52 for generating three-dimensional models of at least two objects among the components of the robot 1, the hand 2, and the objects arranged around the robot 1. The model generation unit 52 generates a three-dimensional model of each object based on the three-dimensional information 58.

Figure 3:
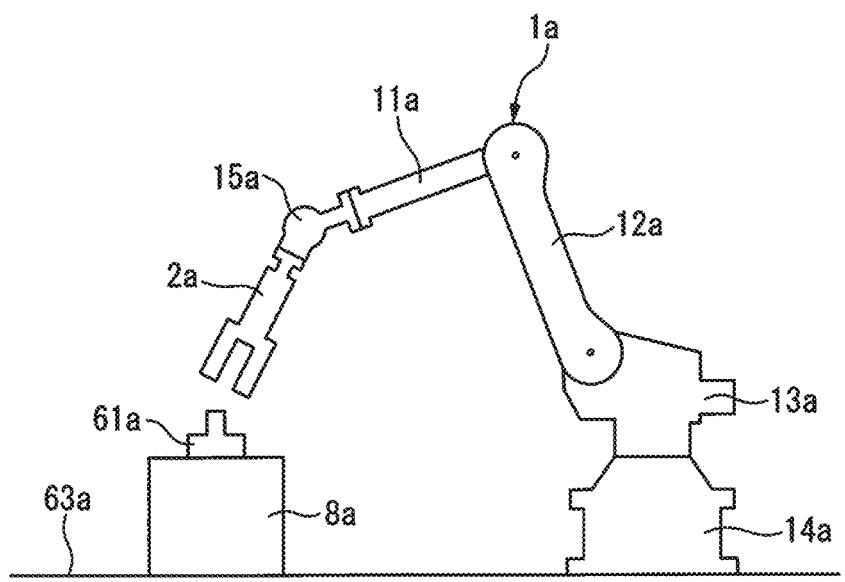
FIG. 3 is a first side view of a model of the robot device in the embodiment.

FIG. 3 is a first side view of a model of the robot device of the present embodiment. FIG. 3 shows a model of the robot device 5 and a model 8a of the workbench 8 when viewed from the side. With reference to FIGS. 2 and 3, the model generation unit 52 acquires the output of the position detector 18. The model generation unit 52 calculates the current position and orientation of the robot 1 based on the output of the position detector 18. The model generation unit 52 generates a model 1a of the robot 1 according to the current position and orientation of the robot 1. The model generation unit 52 changes the position and orientation of the model 1a according to a change in the actual position and orientation of the robot 1.

The model generation unit 52 generates a three-dimensional model corresponding to each object. The model generation unit 52 can form a model so that the model covers an object to be modeled. The model generation unit 52 can form a model so that the model includes therein an object to be modeled. In addition, in the example shown in FIG. 3, the model generation unit 52 generates a model so that the model is formed along with the shape of the corresponding object.

The model 1a of the robot 1 includes models of the components of the robot 1. The models of the components of the robot 1 include a model 14a of the base 14 and the force detector 19 and a model 13a of the swivel base 13. The models of the components of the robot 1 include a model 12a of the lower arm 12, a model 11a of the upper arm 11, and a model 15a of the wrist 15. Note that, in the present embodiment, the base 14 and the force detector 19 are secured to each other. Thus, the model generation unit 52 generates the model 14a including the base 14 and the force detector 19.

The models 11a, 12a, 13a, 14a, and 15a of the components of the robot 1 can be formed so that the models cover the corresponding components. Each model 11a, 12a, 13a, 14a, 15a has a shape that is formed along with the shape of the corresponding object. For example, the model 12a has a shape corresponding to the shape of the lower arm 12 of the robot 1. Further, the components of the robot 1 may include linear bodies such as electric cables disposed in each component, connectors for electrical connection, robot drive motors, etc. The model generation unit 52 can generate a model of the component so that the model covers all these components.

The model generation unit 52 generates a model 2a of the hand 2. The model of the operation tool can be formed so as to cover the operation tool. The model 2a has a shape corresponding to the shape of the hand 2. The model generation unit 52 generates a model 8a of the workbench 8 as a model of the object disposed around the robot 1. The model of the object to be disposed around the robot can be formed to cover the corresponding object disposed around the robot. The model 8*a* has a shape corresponding to the shape of the workbench 8. The model generation unit 52 forms a model 63*a* of the floor 63 as a model of an object disposed around the robot 1. The model 63*a* can be configured by a plate-like member extending in a three-dimensional space or a surface corresponding to the surface of the floor.

Note that, in the example shown in FIG. 3, the model generation unit 52 forms a model 61*a* of the workpiece 61, but the embodiment is not limited to this. The model 61*a* of the workpiece 61 may not be formed. Next, an example of the embodiment in which the person may be sandwiched will be taken up and explained.

Figure 4:
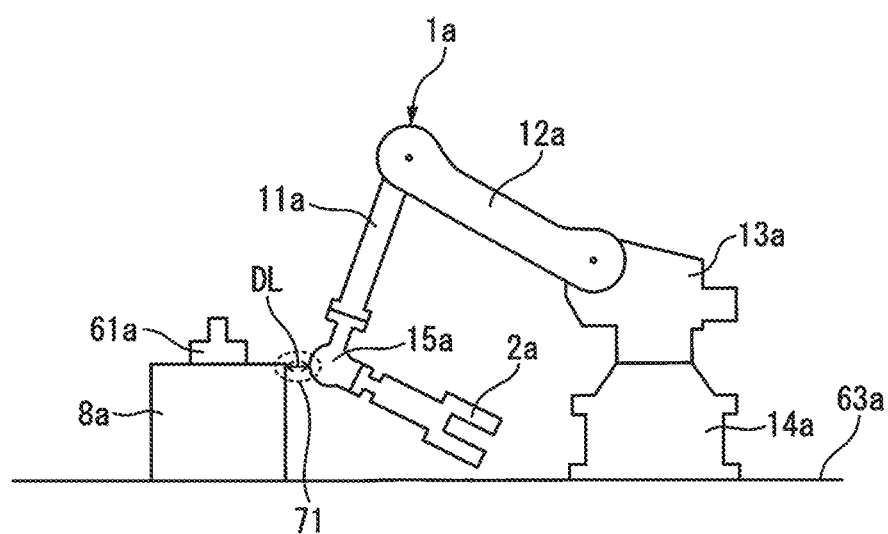
FIG. 4 is a second side view of a model of the robot device in the embodiment.

FIG. 4 is a second side view of the model of the robot device in the present embodiment. The operator may be sandwiched between the component of the robot device 5 and the object existing around the robot 1, depending on the position and orientation of the robot 1. FIG. 4 shows an example in which the operator is sandwiched between the component of the robot 1 and the workbench 8 arranged around the robot 1. In an area 71, the distance between the wrist 15 of the robot 1 and the workbench 8 is small. There is a possibility that the operator may be sandwiched between the wrist 15 and the workbench 8.

With reference to FIGS. 2 and 4, the speed limit unit 51 includes a distance calculation unit 53 for calculating the shortest distance between the two components among the component of the robot 1, the hand 2, and the object arranged around the robot 1 in the three-dimensional model. In the example shown in FIG. 4, the distance calculation unit 53 calculates the shortest distance between the model of each component of the robot and the model of each object arranged around the robot. The distance calculation unit 53 calculates a shortest distance DL between the wrist 15 and the workbench 8.

The distance calculation unit 53 can calculate the shortest distance DL under any control. For example, two objects adjacent to each other can be predetermined in accordance with the position and orientation of the robot 1. Alternatively, two objects for determining the distance can be predetermined. The distance calculation unit 53 can arrange measurement points at predetermined intervals on the surface of the objects for which the distance therebetween is determined. The distance calculation unit 53 calculates the distance between the measurement points for all combinations of the measurement points. Then, the distance calculation unit 53 can set the minimum distance as the shortest distance DL.

The speed limit unit 51 includes a determination unit 54 for determining whether or not the shortest distance DL is less than a distance determination value. The distance determination values relating to an accident caused by sandwiching a person between two objects among the components of the robot, the operation tool, and the objects arranged around the robot, are predetermined. In the present embodiment, the distances between the models which may cause the accident by sandwiching the operator are predetermined as the distance determination values. The distance determination values are stored in the storage unit 42. In this example, a distance determination value for the model 15*a* of the wrist 15 and the model 8*a* of the workbench 8 is predetermined.

The determination unit 54 determines whether or not the current shortest distance DL is less than the distance determination value. When the shortest distance DL is less than the distance determination value, the speed limit unit 51 transmits a command which sets the operation speed of the robot 1 at a speed equal to or lower than the predetermined limit speed to the motion control unit 43. The operation speed of the robot 1 corresponds to the drive speed on each drive axis. For example, the operation speed of the robot 1 is a speed in which the tool center point moves. The motion control unit 43 reduces the drive speeds in all of the drive axes that are driven currently. For example, the motion control unit 43 can control the robot drive motor 22 so that the movement speed of the tool center point is reduced while the movement route of the tool center point is maintained. When the current operation speed of the robot 1 is equal to or lower than the limit speed, the motion control unit 43 performs a control for maintaining the speed.

On the other hand, when the shortest distance DL is equal to or greater than the distance determination value, the speed limit unit 51 can control the operation speed of the robot 1 at a speed which is not limited. The speed limit unit 51 can transmits a command for controlling the operation speed to the motion control unit 43 based on the motion program 41.

The control for reducing the operation speed of the robot 1 to a predetermined limit speed or less includes, for example, an operation for previously determining a low speed. The speed limit unit 51 can perform a control by which the speed is reduced to the low speed. In the above example, the wrist 15 is exemplified as the component of the robot 1, but the embodiment is not limited to this. The component of the robot 1 may be other component such as the upper arm 11, etc.

Figure 5:
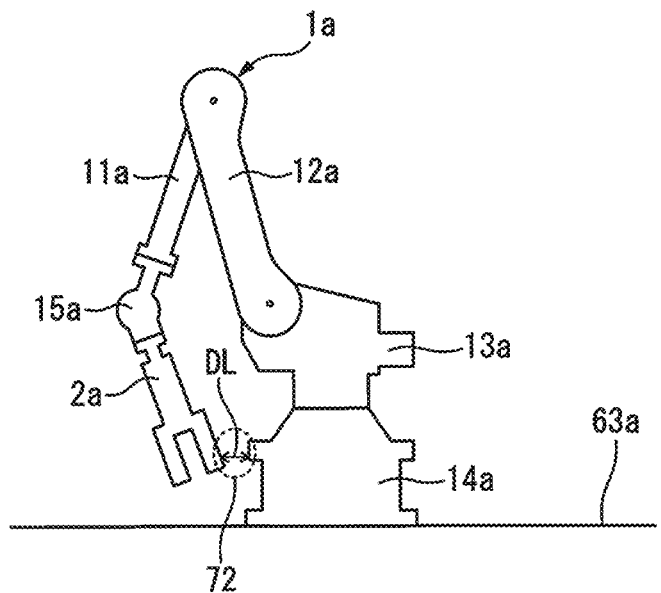
FIG. 5 is a third side view of a model of the robot device in the embodiment.

FIG. 5 is a third side view of the model of the robot device in the present embodiment. FIG. 5 shows an example in which the person is sandwiched between the operation tool and the component of the robot 1. With reference to FIGS. 2 and 5, in an area 72 where the hand 2 and the base 14 face each other, there is a possibility that the operator may be sandwiched between the hand 2 and the base 14. The distance calculation unit 53 calculates the shortest distance between the model of the component of the robot and the model of the operation tool. In this embodiment, the distance calculation unit 53 calculates the shortest distance DL between the model 14*a* including the base 14 and the model 2*a* of the hand 2. The distance determination values between the model of the operation tool and the models of the components of the robot 1 are stored in the storage unit 42. In this embodiment, the distance determination value between the hand 2 and the base 14 is stored. The determination unit 54 determines whether or not the calculated shortest distance DL is less than the distance determination value. When the shortest distance DL is less than the distance determination value, the speed limit unit 51 can perform the control for reducing the operation speed of the robot 1 to or below the limit speed.

Figure 6:
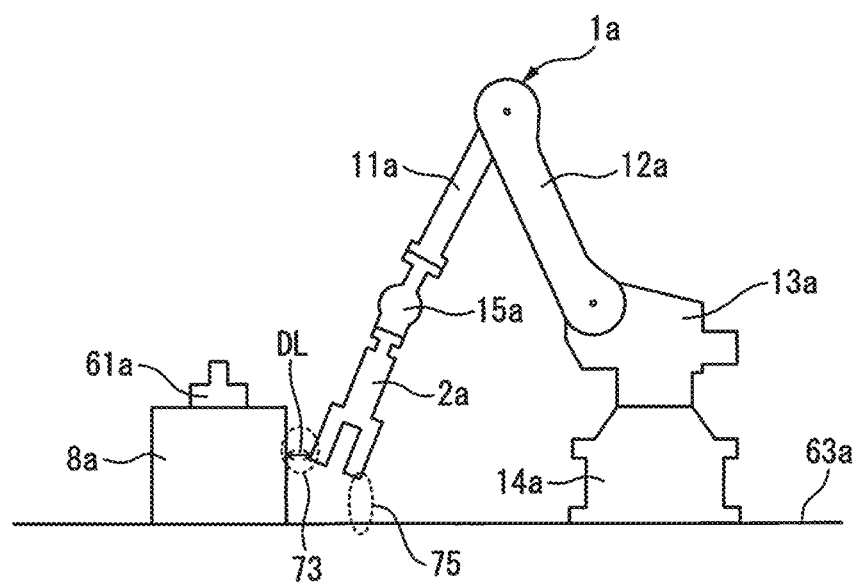
FIG. 6 is a fourth side view of a model of the robot device in the embodiment.

FIG. 6 is a fourth side view of the model of the robot device in the present embodiment. FIG. 6 shows an example in which the operator may be sandwiched between the operation tool and the object disposed around the robot 1. There is a possibility that the operator may be sandwiched between the hand 2 and the workbench 8 in an area 73 where the hand 2 and the workbench 8 face each other. The distance calculation unit 53 calculates the shortest distance between the model of the operation tool and the model of the object disposed around the robot 1. In this embodiment, the distance calculation unit 53 calculates the shortest distance between the model 2*a* of the hand 2 and the model 8*a* of the workbench 8. The storage unit 42 stores distance determination values between the operation tool and the objects arranged around the robot 1. In this embodiment, the distance determination value between the model 2*a* of the hand 2 and the model 8*a* of the workbench 8 is stored. The determination unit 54 determines whether or not the calculated shortest distance DL is less than the distance determination value. When the shortest distance DL is less than the distance determination value, the speed limit unit 51 can perform the control for reducing the operation speed of the robot 1 to or below the limit speed.

As an object to be disposed around the robot 1, a machine tool or the like can be exemplified as described above. Further, in the example shown in FIG. 6, there is a possibility that the operator may be sandwiched by the hand 2 and the floor 63 in an area 75. The floor 63 can be adopted as an object to be disposed around the robot 1. The distance calculation unit 53 can calculate the shortest distance between the model 2a of the hand 2 and the model 63a of the floor 63. The storage unit 42 can store a distance determination value relating to an accident caused by sandwiching the person between the hand 2 and the floor 63. Then, the determination unit 54 can determine whether or not the shortest distance between the model 2a and the model 63a is less than the distance determination value.

Figure 7:
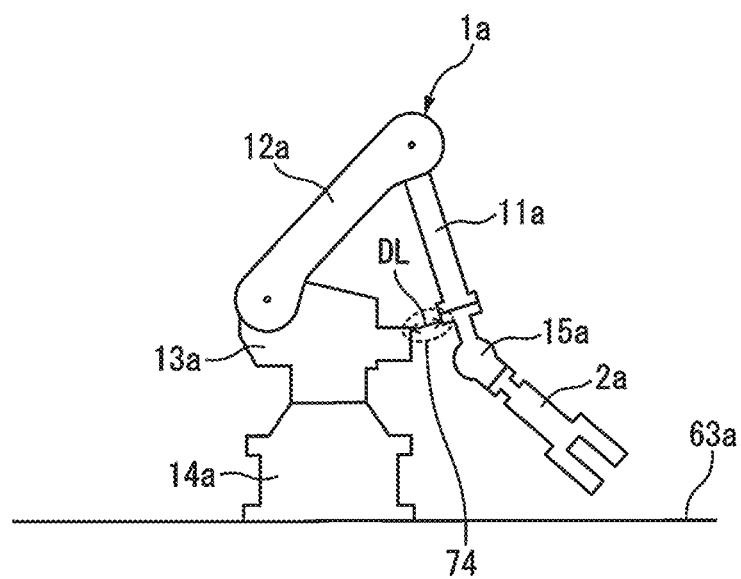
FIG. 7 is a fifth side view of a model of the robot device in the embodiment.

FIG. 7 is a fifth side view of the model of the robot device in the present embodiment. FIG. 7 shows an example in which the operator is sandwiched by a first component of the robot and a second component of the robot. In other words, FIG. 7 shows an example in which the operator is sandwiched by two components included in the robot 1. With reference to FIGS. 2 and 7, in an area 74 in which the wrist 15 as a first component and the swivel base 13 as a second component face each other, there is a possibility that the operator may be sandwiched between the wrist 15 and the swivel base 13. The distance calculation unit 53 calculates the shortest distance between the model of the first component and the model of the second component. In this embodiment, the distance calculation unit 53 calculates the shortest distance DL between the model 15a of the wrist 15 and the model 13a of the swivel base 13. A distance determination value between the model of the first component and the model of the second component is stored in the storage unit 42. The determination unit 54 determines whether or not the calculated shortest distance DL is less than the distance determination value. When the shortest distance DL is less than the distance determination value, the speed limit unit 51 can perform the control for reducing the operation speed of the robot 1 to or below the limit speed.

Note that, as the two components of the robot, any components of the robot 1 between which the operator may be sandwiched can be selected. For example, the upper arm 11 and the base 14 can be selected as the two components of the robot 1 between which the operator may be sandwiched.

Figure 8:
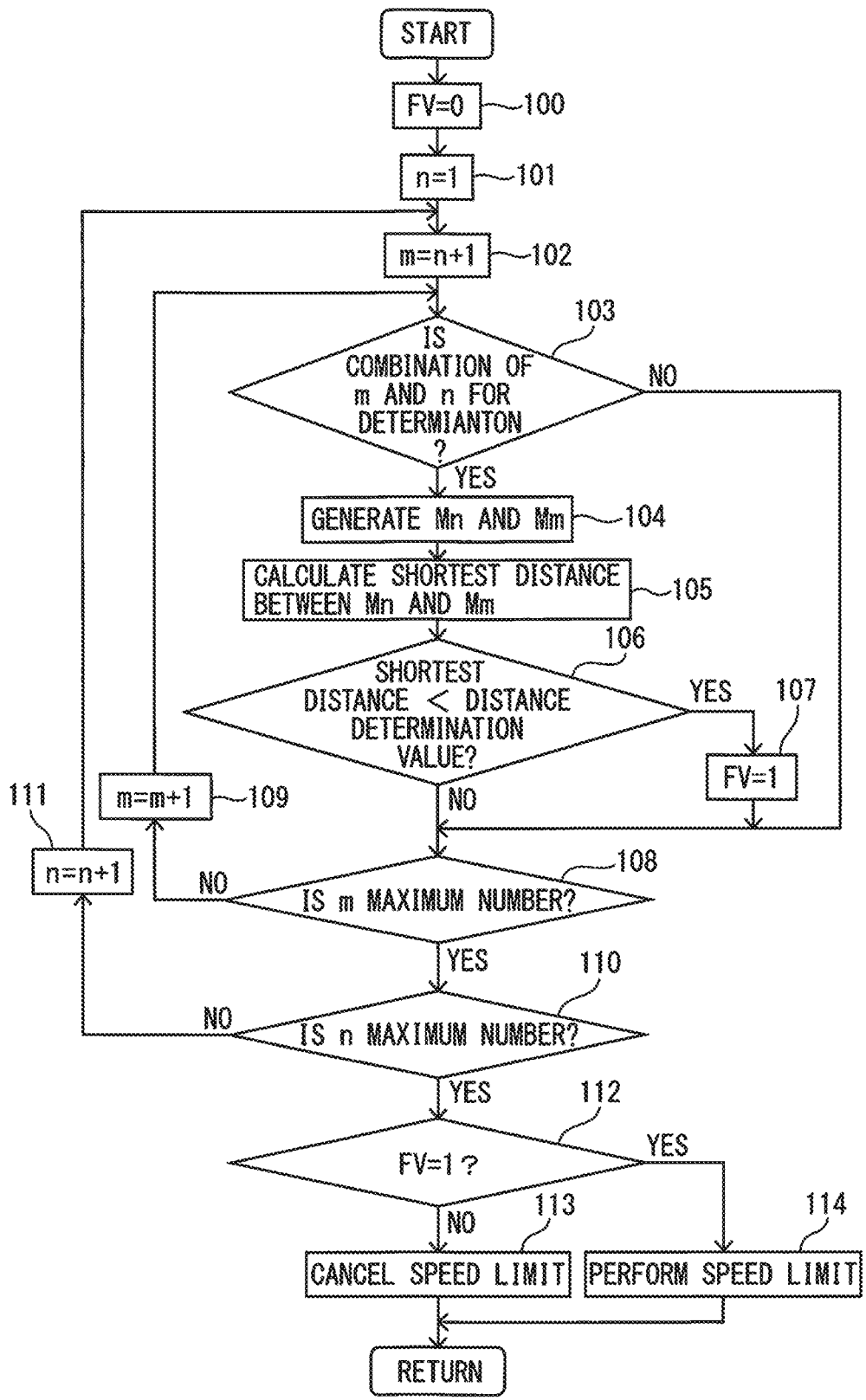
FIG. 8 is a flowchart of a control of the control device of the robot in the embodiment.

FIG. 8 is a flowchart of the control of the control device in the present embodiment. In the present embodiment, the control device 4 selects two objects among all objects between which the person may be sandwiched. Then, the shortest distance between the two objects is calculated, and it is determined whether or not the shortest distance is less than the distance determination value.

As shown in the following Table 1, the storage unit 42 stores the distance determination values between the models of objects. In Table 1, the determination value for the distances between model Mm and model Mn is shown. Each distance determination value can be set at a value including a distance at which a person is sandwiched between two members and a margin. Note that the two members coupled to each other are not to be determined because the shortest distance is zero. Thus, "−1" is stated in Table 1. For example, the shortest distance between the swivel base 13 and the lower arm 12 is zero. Thus, a flag "−1" that is not to be determined is stated in the column for the determination value of the distance between the model M2 showing the model 13a of the swivel base 13 and the model M3 showing the model 12a of the lower arm 12.

TABLE 1

| Mn | Mm | | | | | | | |
|---|---|---|---|---|---|---|---|---|
|  | M1 | M2 | M3 | M4 | M5 | M6 | M7 | M8 |
| M1 |  | −1 | 200 | 200 | 200 | 200 | 200 | 300 |
| M2 |  |  | −1 | 200 | 200 | 200 | 200 | 300 |
| M3 |  |  |  | −1 | 100 | 100 | 100 | 300 |
| M4 |  |  |  |  | −1 | 100 | 100 | 300 |
| M5 |  |  |  |  |  | −1 | 100 | 300 |
| M6 |  |  |  |  |  |  | 100 | 300 |
| M7 |  |  |  |  |  |  |  | −1 |
| M8 |  |  |  |  |  |  |  |  |

M1: model of base and force detector
M2: model of swivel base
M3: model of lower arm
M4: model of upper arm
M5: model of wrist
M6: model of hand
M7: model of workbench
M8: model of floor With reference to FIGS. 2 and 8, at step 100, the speed limit unit 51 sets a flag FV indicating the speed limit operation at 0. Subsequently, at step 101, the speed limit unit 51 sets a variable n at 1. Subsequently, at step 102, the speed limit unit 51 sets a variable m at (n+1).

Subsequently, at step 103, the speed limit unit 51 determines whether or not the combination of the variable m and the variable n is the target to be determined. In other words, it is determined whether or not "−1" is stated in Table 1. If the combination of the variable m and the variable n is not the target to be determined, the control is shifted to step 108. If the combination of variable m and variable n is the target to be determined, the control is shifted to step 104.

At step 104, the model generation unit 52 detects the position and orientation of the robot 1 based on the output of the position detector 18. The model generation unit 52 calculates the position of the object corresponding to the model Mm and the object corresponding to the model Mn, based on the position and orientation of the robot 1. When the models Mm and Mn include the component of the robot 1 or the hand 2, the model generation unit 52 calculates the position and orientation of the model. In this way, the model generation unit 52 generates the model Mm and the model Mn based on the position and orientation of the robot 1. At step 105, the distance calculation unit 53 calculates the shortest distance between the model Mn and the model Mm.

Subsequently, at step 106, the determination unit 54 determines whether or not the shortest distance between the model Mn and the model Mm is smaller than the corresponding distance determination value shown in Table 1. At step 106, when the shortest distance is less than the distance determination value, the control is shifted to step 107. In this case, it can be determined that there is a possibility that the operator may be sandwiched. At step 107, the speed limit unit 51 sets the speed limit flag FV at 1. Thereafter, the control is shifted to step 108.

At step 106, when the shortest distance is equal to or greater than the corresponding distance determination value, the control is shifted to step 108. At step 108, the speed limit unit 51 determines whether or not the variable m is the maximum number. The maximum number of variable m is the number of the target object. In the example shown in Table 1, the maximum number of the variable m is 8. At step 108, when the variable m is not the maximum number, the control is shifted to step 109.

At step 109, 1 is added to the variable m. Then, the control is returned to step 103. In this way, the speed limit unit 51 determines whether or not the shortest distance between the objects is less than the determination distance, while the variable m is changed to the maximum number with the variable n being fixed.

At step 108, when the variable m is the maximum number, the control is shifted to step 110. At step 110, the speed limit unit 51 determines whether or not the variable n is the maximum number. The maximum number of the variable n is the number of the target objects. In the example shown in Table 1, the maximum number of variable n is 8.

At step 110, when the variable n is not the maximum number, the control is shifted to step 111. At step 111, a control for adding 1 to the value of the variable n is performed. Then, the control is returned to step 102. In this manner, it is possible to determine the distance between the two objects by changing the variable n from 1 to the maximum number.

At step 110, when the variable n is the maximum number, the control is shifted to step 112. In other words, when the determination of the distance for the combination of all objects is completed, the control is shifted to step 112. In the above control, the distances are determined for all combinations of the model Mm and the model Mn. Then, when the shortest distance is smaller than the distance determination value in at least one combination, the speed limit flag FV is 1 at step 107.

At step 112, the speed limit unit 51 determines whether or not the speed limit flag FV is 1. When the flag FV is 1, the control is shifted to step 114. At step 114, the speed limit unit 51 transmits a command, which controls the operation speed of the robot 1 so that the operation speed is equal to or lower than the predetermined limit speed, to the motion control unit 43. The motion control unit 43 controls the robot drive motor 22 based on this command so that the operation speed of the robot 1 is equal to or lower than the limit speed.

At step 112, when the flag FV is not 1, the control is shifted to step 113. At step 113, when the speed is limited for the current operation of the robot, the speed limit unit 51 performs a control for canceling the speed limit. The speed limit unit 51 transmits a command for canceling the speed limit to the motion control unit 43. The motion control unit 43 cancels the speed limit, and drives the robot 1 at the operation speed based on the motion program 41. When the speed limit is not performed for the current operation of the robot, the speed limit unit 51 maintains the current state.

The control shown in FIG. 8 can be repeated, for example, at predetermined time intervals. Then, when the distance between the two objects decreases, the speed limit unit 51 can limit the speed of the robot 1. After that, when the distance between the two objects increases, the speed limit unit 51 can cancel the speed limit.

The control device 4 of the present embodiment can limit the operation speed of the robot 1 at the position and orientation of the robot 1 in which there is a possibility that the person may be sandwiched. When the person is sandwiched by the component of the robot 1 or the operation tool, the robot 1 stops. At this time, since the operation speed of the robot 1 is limited, it is possible to reduce the distance by which the component of the robot 1 or the operation tool moves by the inertia. As a result, it is possible to reduce the influence of sandwiching on the operator. In the robot 1 of the present embodiment, the space in which the person is sandwiched can be suppressed from being reduced after the stop command of the robot 1 is issued, and accordingly, the safety is improved.

Figure 9:
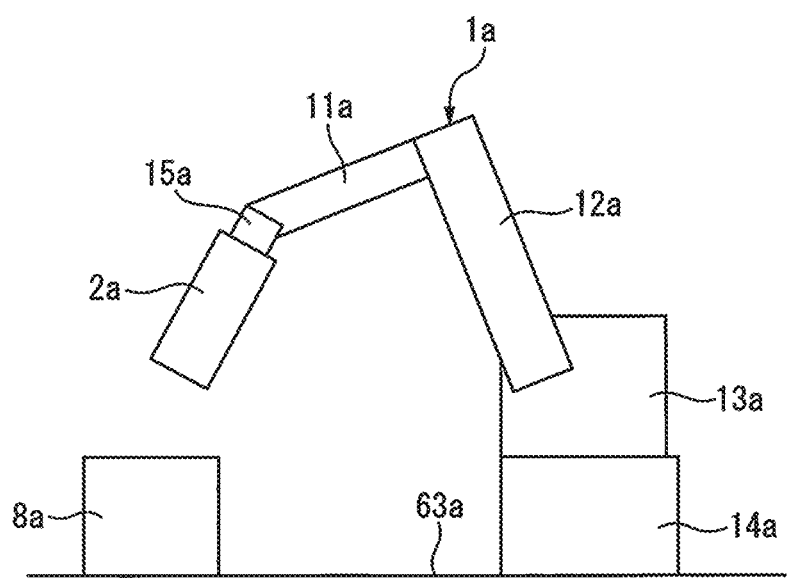
FIG. 9 is a side view of another model of the robot in the embodiment.

FIG. 9 is a side view of another model of the robot device in the present embodiment. The model of each object in the above embodiment has a shape that is formed along with the shape of the object. On the other hand, the model of each object can be formed in a simple shape such as rectangular parallelepiped, cube, sphere, cylinder, etc. Alternatively, a model in which the end face of the cylinder is a hemisphere can be adopted. Each model has a size in which the object is contained in the model. In other words, each model is formed so as to cover the object corresponding to the model.

The model of each component of the robot 1 shown in FIG. 9 is formed by a rectangular parallelepiped. The models 11a, 12a, 13a, 14a, and 15a of the components of the robot 1 are formed so as to contain therein the corresponding components. For example, the model 11a of the upper arm 11 is formed so as to contain the main body of the upper arm 11 as well as linear bodies disposed around the main body. The model 2a of the hand 2 is formed of a rectangular parallelepiped. The model 2a is formed so as to contain therein the hand 2.

In this way, the model having a simple shape is adopted as a model of each component, whereby the amount of calculation in the control device can be reduced, and the load on the control device can be reduced. Thus, the control according to present embodiment can be performed by a control device with low performance.

In the control of the robot 1 according to present embodiment, when there is a possibility that the operator may be sandwiched, the operation speed of the robot 1 is reduced. In addition to this control, when there is a possibility that the two objects among the component of the robot, the operation tool, and the object arranged around the robot may come into contact with each other, a control for limiting the operation speed of the robot 1 can be performed. For example, when there is a possibility that the two objects may interfere with each other, the speed limit unit can reduce the operation speed of the robot.

The operator can previously set a contact determination value as determination value for the distance when the two objects among the component of the robot, the operation tool, and the object arranged around the robot come into contact with each other. The contact determination value relating to the contact between the two objects are set to be smaller than the distance determination values relating to the accident caused by sandwiching the person. The storage unit can store the contact determination value relating to the contact of the two objects.

The determination unit determines whether or not the shortest distance between the two objects is less than the corresponding contact determination value. The speed limit unit can control the operation speed of the robot so that the operation speed is equal to or lower than a predetermined limit speed, when the shortest distance is less than the contact determination value. In this control, the limit speed relating to the contact can be set to be smaller than the limit speed relating to the sandwiching accident. Alternatively, the speed limit unit can perform a control for setting the operation speed of the robot at zero. By adopting this control, the operation speed of the robot can be reduced when objects are likely to interfere with each other.

In the above embodiment, the model generation unit generates models of all components of the robot, operation tool, and objects arranged around the robot, but the embodiment is not limited to this. The model generation unit is only required to generate at least two models in order to determine the distance.

In a robot device that is capable of operating in cooperation with the operator, the robot independently performs an operation in some cases. When the robot works alone, the operator is away from the robot. The control device can perform the cooperative control when the operator and the robot work at the same time, and a high-speed control when the robot independently works. In the cooperative control, it is possible to implement the above-mentioned control for limiting the operation speed of the robot. In the high-speed control, it is possible to prohibit the control for stopping the robot when the operator comes into contact with the robot. Further, in the high-speed control, it is possible to prohibit the control for limiting the operation speed of the robot in the present embodiment. The control device can be formed so as to switch between the cooperative control and the high-speed control. As described above, the high-speed control is performed, whereby the robot device can operate at high speed when there is no person near the robot.

In the present embodiment, the articulated robot has been described as an example, but the embodiment is not limited to this. The present invention can be applied to a control device for controlling any robot. For example, the drive axes of the robot in the above embodiment are constituted by the rotation axes, but the embodiment is not limited to this. The drive axes of the robot may include a linear motion axis in which the component of the robot linearly moves.

According to one aspect of the present disclosure, it is possible to provide the control device for the robot, which reduces the influence on the operator when the operator is sandwiched by the operation of the robot.

In the above-described control, the order of the steps can be appropriately changed within a range in which functions and actions are not changed. The above embodiments can be combined as appropriate. In each of the above figures, the same or equivalent parts are designated by the same reference numerals. It should be noted that the above embodiments are examples and do not limit the invention. Further, in the embodiments, modifications of the embodiments indicated in claims are included.

The invention claimed is:

1. A control device for controlling an operation speed of a robot, the control device comprising:
a processor configured to
stop an operation of the robot in response to a person coming in contact with the robot, and
limit the operation speed of the robot, wherein
a distance determination value relating to an accident caused by sandwiching a person between two objects among a component of the robot, an operation tool attached to the robot, and an object arranged around the robot is predetermined,
a contact determination value is a determination value for a distance when the two objects among the component of the robot, the operation tool, and the object arranged around the robot come into contact with each other,
the contact determination value relating to contact between the two objects is a value that is different from the distance determination value relating to the accident caused by sandwiching the person,
the processor is configured to
generate three-dimensional models of the two objects among the component of the robot, the operation tool, and the object arranged around the robot,
calculate a shortest distance between the models of the two objects in the three-dimensional models,
determine whether or not the shortest distance is less than the distance determination value,
in response to the shortest distance being less than the distance determination value, control the operation speed of the robot so that the operation speed is equal to or lower than a first limit speed determined in advance,
determine whether or not the shortest distance is less than the contact determination value, and
in response to the shortest distance being less than the contact determination value, control the operation speed of the robot so that the operation speed is equal to or lower than a second limit speed determined in advance.

2. The control device according to claim 1, wherein
the two objects for which the shortest distance is determined by the processor include the component of the robot and the object arranged around the robot,
the processor is configured to generate
the model of the component of the robot so as to cover the component of the robot, and
the model of the object arranged around the robot so as to cover the object arranged around the robot,
the distance determination value is a determination value for the distance between the model of the component of the robot and the model of the object arranged around the robot, and
the processor is configured to calculate the shortest distance between the model of the component of the robot and the model of the object arranged around the robot.

3. The control device according to claim 1, wherein
the two objects for which the shortest distance is determined by the processor include the component of the robot and the operation tool,
the processor is configured to generate
the model of the component of the robot so as to cover the component of the robot, and
the model of the operation tool so as to cover the operation tool,
the distance determination value is a determination value for the distance between the model of the component of the robot and the model of the operation tool, and
the processor is configured to calculate the shortest distance between the model of the component of the robot and the model of the operation tool.

4. The control device according to claim 1, wherein
the two objects for which the shortest distance is determined by the processor include the operation tool and the object arranged around the robot,
the processor is configured to generate
the model of the operation tool so as to cover the operation tool, and
the model of the object arranged around the robot so as to cover the object arranged around the robot,
the distance determination value is a determination value for the distance between the model of the operation tool and the model of the object arranged around the robot, and
the processor is configured to calculate the shortest distance between the model of the operation tool and the model of the object arranged around the robot.

5. The control device according to claim 1, wherein
the two objects for which the shortest distance is determined by the processor include a first component of the robot and a second component of the robot, the processor is configured to generate
  a model of the first component so as to cover the first component, and
  a model of the second component so as to cover the second component,
the distance determination value is a determination value for the distance between the model of the first component and the model of the second component, and
the processor is configured to calculate the shortest distance between the model of the first component and the model of the second component.

6. The control device according to claim 1, wherein the contact determination value is set to be smaller than the distance determination value.

\* \* \* \* \*